Aug. 12, 1958

A. NOVOTNY 2,846,870

METHOD AND APPARATUS FOR DETERMINING THE SURFACE TENSION
AND VISCOSITY OF MOLTEN SUBSTANCES

Filed Aug. 16, 1955

INVENTOR
Antonín Novotný

BY

United States Patent Office 2,846,870
Patented Aug. 12, 1958

2,846,870

METHOD AND APPARATUS FOR DETERMINING THE SURFACE TENSION AND VISCOSITY OF MOLTEN SUBSTANCES

Antonín Novotný, Komarov, near Horovice, Czechoslovakia

Application August 16, 1955, Serial No. 528,793

5 Claims. (Cl. 73—15)

The present invention relates to a method for determining the surface tension, viscosity and other properties of materials, in particular glass-metals, enamels, plastics, metals and the like, which are liquid only at elevated temperatures, as well as to an apparatus for carrying out said method.

The best known hitherto employed method for determining the coefficient of inner friction is a method using a submerged ring, a small body or the like (W. N. Harrison). The coefficient of internal friction at a given temperature is determined from the deflection of a freely suspended ring which is submerged in a rotating body of molten enamel. The apparatus operates with great accuracy, but is very expensive. The handling of the apparatus is difficult because of the necessity of tedious cleaning of the platinum melting crucible and submerging ring, which have to be subjected to boiling in hydrofluoric gas after each measurement. An equally accurate method is the method of V. H. Stott, O. Turner and H. A. Slomann, the principle of which resides in measuring the thickness of the glass metal which is entrained by a thin platinum wire drawn out of the molten enamel with a known velocity. None of the said methods gives, however, a general picture of the character of the substance in molten condition.

The present invention has definite advantages over the aforementioned methods. The apparatus according to the invention employs a so called principle of "forming a drop" by melting away a test rod; this offers the possibility of ascertaining the character of the molten substance by means of a graphic record, or diagram, from which numerous constants may be obtained, characterising the given substances in molten condition. A further advantage resides in the possibility of registering the constants required for the determination of the surface tension, viscosity and fluidity at elevated temperature ranges, at which the devices mentioned above are unusable.

The principle of the "melting away of a drop" according to the above mentioned method, on which the present invention is based, is the following:

A vertically suspended test rod of a known diameter is brought to a position where its bottom end is subjected to heating at one point. By the influence of the heat the cohesion of the rod is destroyed and a drop formed. In the moment when the weight of the drop overcomes the surface tension of the molten material of the test rod, an apparent elongation of the rod takes place, and a certain portion of the rod drops down. In the next moment the rod is lowered again by a distance equal to the lost length of the rod, which has been consumed by the formation of the drop.

From the known diameter of the rod and its lost length the volume of one drop may be calculated. The specific gravity being known, the force required for overcoming the surface tension of the substance at a given temperature may be calculated. The entire course of the procedure from the beginning of heating to the dropping-off of the formed drop may be recorded graphically by a recording apparatus.

The surface tension may be calculated from the following formula:

$$F = \frac{m \cdot g}{2\pi r}$$

where $m$ = weight of the drop
$g$ = acceleration by gravitation
$r$ = radius of the test rod The weight of one drop is: $m = \pi \cdot r^2 \cdot h \cdot s$ where $r^2$ = cross-sectional area of the rod
$h$ = decrease of length of the rod corresponding to the formation of one drop
$s$ = specific mass of the substance By inserting into the formula for surface tension the following is obtained:

$$F = \frac{\pi \cdot r^2 \cdot h \cdot s \cdot g}{2\pi r} = \frac{1}{2} r \cdot h \cdot s \cdot g$$

The above formula corresponds to the formula for capillary elevation.

The equation for the coefficient of internal friction is as follows:

$$\eta = \frac{F}{4.8} \cdot \frac{(r - r')}{W_o \cdot r}$$

The calibration constant of the apparatus has been determined by comparative measurements and is expressed by the formula $$\omega = \frac{r - r'}{r'} = \frac{d}{r}$$

Its value may be considered constant with respect to small differences between the coefficient of heat conductivity of different kinds of glass.

The formula for the coefficient of internal friction is therefore $$\eta = \frac{\omega}{4.8} \cdot \frac{F}{W_o}$$

Where $W_o$, i. e. the velocity with which the drop runs down is given by the inclination of the curve of the graphic record (diagram) so that the length as well as time may be measured directly from the diagram.

The accompanying drawings show by way of example the principle and the operation of apparatus used for the measurement according to the invention.

Figure 1:
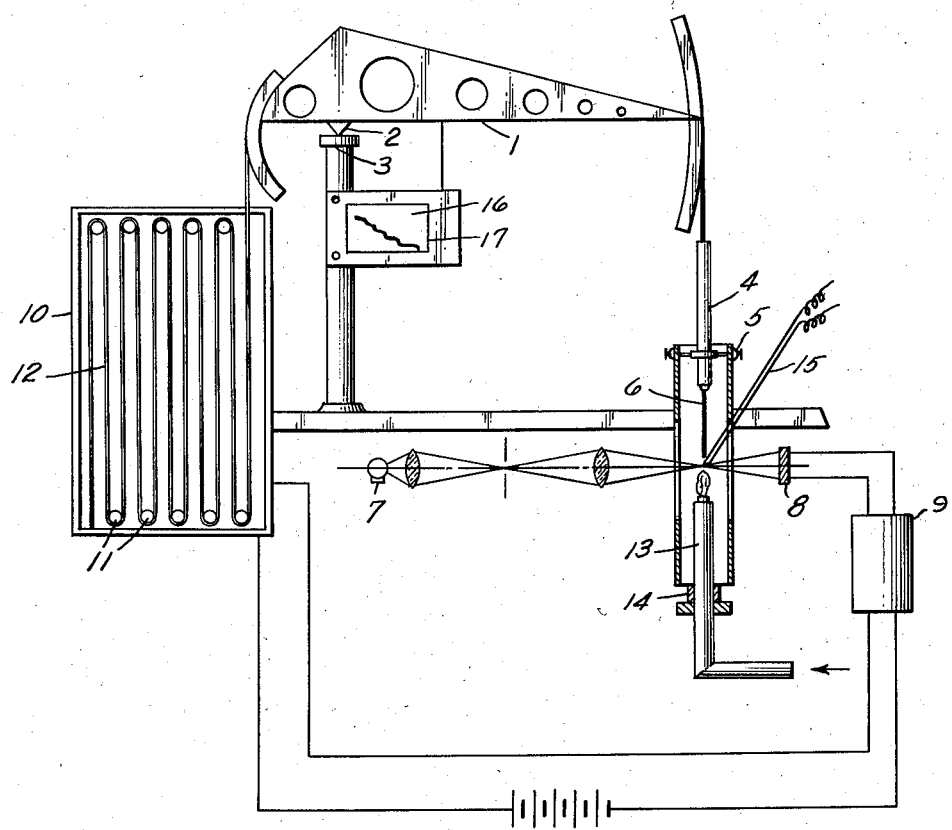
Fig. 1 is a diagrammatic representation of an apparatus embodying this invention and its electric connection.

Referring first to Fig. 1, a beam 1 is mounted by means of a prism 2 for rocking movement in a bearing 3. On the longer arm of the beam 1 a guiding cylinder 4 is suspended and maintained in vertical position by an adjusting device 5. A test rod 6 is hinged at the lower end of the guiding cylinder. The bottom end of the test rod extends to a focal point of light rays emitted by a source 7. By pulling the rod 6 upwards out of the focal point, the path of the light rays, which up to now has been obstructed by the rod 6, is set free and light rays fall on a photo-cell 8, which by means of a relay 9 closes a circuit of a lowering device. The lowering device consists of a frame 10 in which a resistance wire or string 12 is tensioned between rollers 11. The string 12 is secured at one of its ends to the frame 10 and at its other end to the shorter arm of the beam 1. When the circuit of the lowering device is closed the string 12 is heated and by its heat dilation causes the beam 1 to be deflected and the test rod 6 lowered with its bottom end into the focal point of the light rays. This, in turn, causes an interruption of the current supplied to the lowering device, the string 12 cools down and shrinks so as to pull the test rod 6 upwards out of the focal point. The process of lowering and lifting the test rod, caused by the reaction of the photo-cell to the interruption of light rays is periodically repeated in short intervals in the course of the measurement.

If the bottom end of the test rod 6 is heated by the flame of a torch 13, the temperature of which may be changed by means of a slidable member 14, the end of the test rod 6 begins to be transformed into a drop with a simultaneous decrease of the length of the rod. The temperature of the flame is measured during this process by a thermo-element 15 adapted to be inserted into a suitable position. At the moment when the weight of the drop overcomes the surface tension of the molten substance a portion of the rod 6 drops down. All changes of the length of the rod 6 influence the position of the beam 1 which carries out corresponding rocking movements by reason of the cooperation of light source 7, photocell 8, relay 9 and string 12, and the rocking movements of the beam are recorded by a recording means. The latter comprise a steel needle 16, which engraves hair lines into a moving strip 17 of suitable material e. g. of a material known under the trade name "cellophane." The thinness of the lines warrants the accuracy of the recording. In order to make the curves visible, colour may be rubber in and the curves may then be copied or reproduced by photography.

Figure 2:
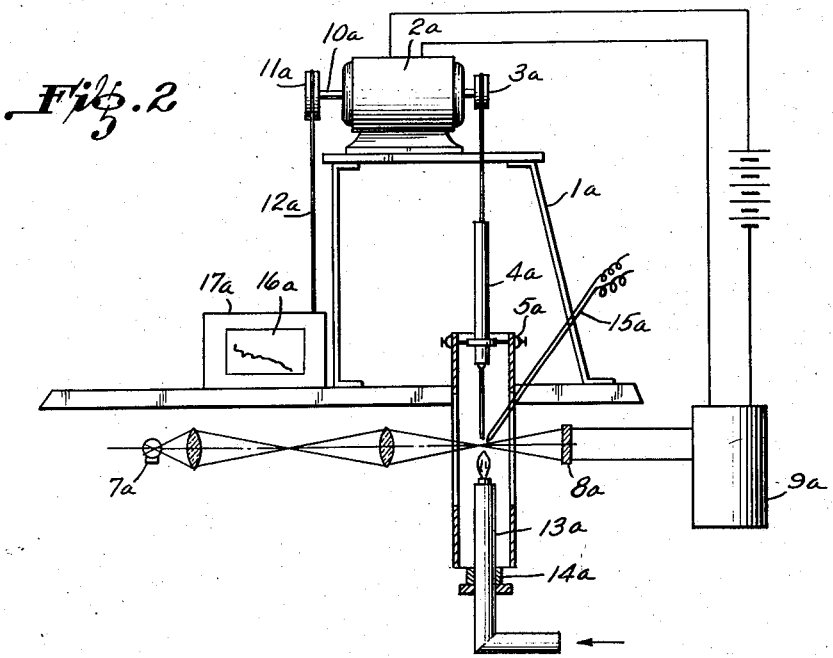
Fig. 2 is a view similar to Fig. 1 of the drawings, but showing another embodiment of the invention.

In the embodiment of the invention illustrated in Fig. 2, a reversible electric motor 2a is mounted on a pedestal 1a, and a thread is wound on a drum 3a secured on one end of the shaft 10a of the motor. A metal guiding cylinder 4a is suspended from the thread wound on drum 3a and a test rod 6a is hung from the guiding cylinder. An adjusting device 5a is employed for centering the cylinder 4a and for maintaining the latter in a vertical condition. A light source 7a emits light rays which are brought to a focus at a point near the bottom end of the test rod 6a. A photocell 8a is disposed to receive light rays from source 7a when the test rod is raised so that the bottom end of the latter is removed from the focal point of the light rays. When the rod 6a is lowered by unwinding of the thread on drum 3a, the lower end of the test rod interrupts the light rays from source 7a and prevents energization of the photocell.

The photocell 8a controls a relay 9a which, in turn, controls the direction of current fed to the windings of motor 2a. When light rays fall on the photocell 8a, relay 9a causes the shaft 10a of motor 2a to rotate in the direction unwinding thread from drum 3a so that the test rod 6a is lowered to interrupt the light rays. When the light rays are interrupted by the bottom end of the test rod, the photocell then causes the relay 9a to reverse the current through the windings of motor 2a so that the shaft of the latter turns in the direction winding the thread on to the drum 3a and thereby raising the test rod. Thus, the test rod 6a is vertically reciprocated within small limits so that its bottom end remains at the focal point of the light rays from source 7a.

All the rotational movements of the motor shaft 10a, and hence the vertical movements of the test rod 6a, are recorded by a recording device 16a—17a which is controlled by a thread 12a wound on a drum 11a which is also secured on the shaft 10a. As in the case of the apparatus described in connection with Fig. 1, a heater 13a with an adjustable control 14a is disposed for melting the bottom end of the test rod, and a pyrometer 15a is provided for indicating the temperature at the bottom end of the test rod.

It is apparent that the apparatus of Fig. 2 is effective to record all changes in the length of the test rod 6a as a molten drop is formed at the bottom end of the rod and then falls from the latter.

Figure 3:
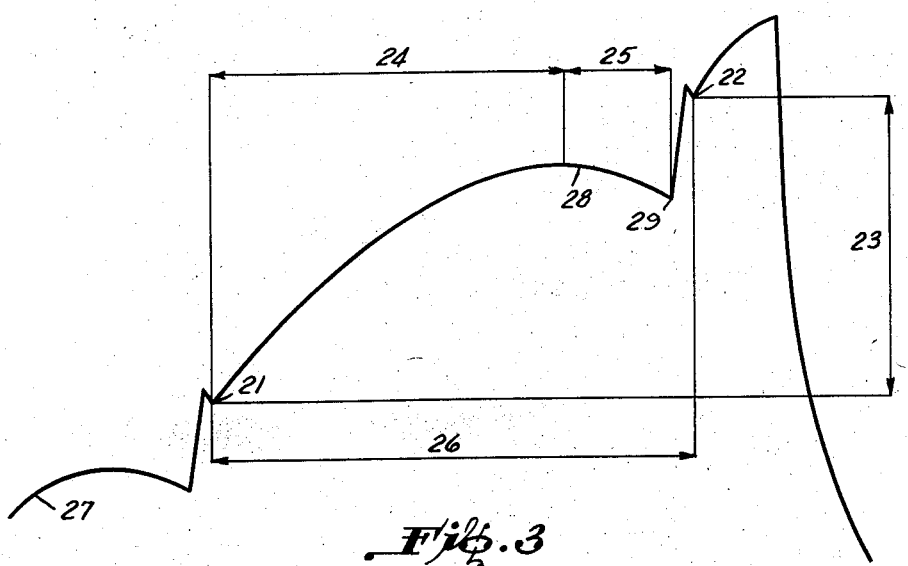
Fig. 3 is a diagram recorded for a glass known under the trade name "Kavalier glass K35."

Fig. 3 is a graphic representation of a record taken for a glass known under the trade name "Kavalier glass K35." Point 21 is considered the beginning of the curve (the starting portion 27 being omitted), and from this point the curve rises as high as the point 28 with a velocity corresponding to the formation of the drop. From point 28 the process of dropping down takes place, i. e. at point 28 the drop reaches such a weight that it outweighs the force of the surface tension which has drawn the drop upwards. At point 29 the process of dropping off comes to an end, because the falling drop of molten glass metal has reached such a velocity that the apparatus has ceased to follow the same and is directed violently to point 22 which is the starting point of a further curve; hereupon the whole process is repeated. The total height of the curve shown in the diagram by the dimension 23 indicates after a simple calculation in the ratio of magnification of the recording, as compared with the actual process, with sufficient accuracy the loss of length of the rod, consumed for the formation of one drop. The diameter of the rod being known (having been measured prior to the operation), the volume of a cylinder which is equal to the volume of the drop may easily be calculated. The specific weight of glass-metal being known, the weight of the drop on which the calculation of the surface tension is based may be calculated with sufficient exactness.

Because the ordinate (horizontal dimension) of the diagram indicates the course of the process as to time, the dimension 24 represents the time required for the formation of the drop, the dimension 25 the time of its dropping off and the dimension 26 the total time of one full cycle. It has been found by experiments that the total times represented by the dimension 26 (after reduction to an equal diameter of the rod) are with respect to the temperatures, at which the measurements are taken, in the ratio of the viscosities of the measured glass, i. e. that it is sufficient to calibrate the apparatus for glass metals having a known course of viscosity curves in order to express in poise the measured values which have been read on the dimension 26.

If the necessary calculation factors are represented graphically, the time required for determining the viscosity, when measurements are carried out in series, does not exceed 30 to 40 minutes on the average after the preparation of the test rods. Into preliminary prepared diagrams the measured values are inserted and the resulting viscosities may be directly read.

The devices described above have been disclosed by way of example only, it being understood that individual structural details may be changed without exceeding the scope of the invention.

I claim:

1. A method for simultaneously determining the surface tension and viscosity of molten substances which are solid at normal temperatures, comprising the steps of heating the bottom end of a solid rod of the substance to be tested to form a molten drop thereof which, after overcoming the surface tension, drops from the remainder of the solid rod, and measuring the changes in the length of the rod during the formation of the molten drop and the removal of the latter from the remainder of the rod, which changes in length are characteristic of the surface tension and viscosity of the substance in molten condition.

2. An apparatus for simultaneously determining the surface tension and viscosity of molten substances which are solid at normal temperatures, comprising vertically movable means for supporting a solid test rod of the substance to be tested, actuating means for vertically displacing said supporting means, a light source, optical means for focussing light rays from said source at a point near the bottom end of a test rod carried by said supporting means, light sensitive means for receiving light rays from said source when the supported test rod is raised to remove its bottom end out of the path of the light rays focussed by said optical means, control means for said actuating means operative in response to energizing and de-energizing of said light sensitive means to cause downward movement of said supporting means and the test rod when the bottom end of the latter is disposed above the path of light rays from said source and to cause upward movement of said supporting means and the test rod when the bottom end of the latter interrupts the light rays from said source, respectively, so that the vertical movements of said supporting means are characteristic of any changes in the length of a test rod supported therefrom, heating means disposed to heat the bottom end of a test rod suspended from said supporting means for transforming the bottom end of the test rod into a molten drop which falls from the remainder of the rod after overcoming the surface tension of the molten substance, and recording means producing a record of the vertical movements of said supporting means, and hence of the changes in length of the test rod suspended therefrom, as a function of time.

3. An apparatus as in claim 2; wherein said supporting means includes a vertically movable guide cylinder adapted to have the test rod suspended therefrom, a beam rockably mounted intermediate its ends for swinging in a vertical plane, and means supporting said guide cylinder from one end of said beam so that the guide cylinder and test rod move vertically in response to rocking of the beam, said recording means being operated in response to rocking of said beam.

4. An apparatus as in claim 3; wherein said actuating means includes an elongated element connected to the other end of said beam and adapted to be extended and retracted in response to heating and cooling, respectively, thereof for causing rocking of said beam in the directions producing downward and upward movements, respectively, of said guide cylinder and the test rod, and said control means includes electric circuit means which are completed and interrupted in response to energizing and de-energizing, respectively, of said light sensitive means, said electric circuit means being operative, when completed, to cause heating of said elongated element.

5. An apparatus as in claim 2; wherein said supporting means includes a vertically movable guide cylinder adapted to have the test rod suspended therefrom, and transmission means carrying said guide cylinder and converting rotational movements into vertical movements of said guide cylinder; and wherein said actuating means includes a reversible electric motor connected to said transmission means for rotationally driving the latter, and said control means includes electric circuit means determining the direction of rotation of said reversible electric motor and operating in response to energization and de-energization of said light sensitive means, to cause rotation of said motor in the directions producing downward and upward movements, respectively, of said guide cylinder.

References Cited in the file of this patent

UNITED STATES PATENTS

| 1,096,911 | Hawxhurst | May 19, 1914 |
| 2,679,749 | Poole | June 1, 1954 |

FOREIGN PATENTS

| 378,498 | Germany | July 16, 1923 |

OTHER REFERENCES

Douglas, Journal of Scientic Instruments, vol. 27, March 1950, pages 67–69.